United States Patent
Bauchot et al.

(10) Patent No.: US 7,810,032 B2
(45) Date of Patent: Oct. 5, 2010

(54) SYSTEM AND METHOD FOR PERFORMING OVER TIME STATISTICS IN AN ELECTRONIC SPREADSHEET ENVIRONMENT

(75) Inventors: Frederic Bauchot, Saint-Jeannet (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1422 days.

(21) Appl. No.: 11/225,424

(22) Filed: Sep. 13, 2005

(65) Prior Publication Data
US 2006/0117246 A1 Jun. 1, 2006

(30) Foreign Application Priority Data
Dec. 1, 2004 (EP) .................. 04300834

(51) Int. Cl.
*G06F 17/00* (2006.01)
*G06F 9/45* (2006.01)
(52) U.S. Cl. .................. 715/267; 715/212; 717/160
(58) Field of Classification Search .......... 715/267, 715/212, 219; 717/160
See application file for complete search history.

(56) References Cited

U.S. PATENT DOCUMENTS

| | | | |
|---|---|---|---|
| 5,768,158 A * | 6/1998 | Adler et al. .................. 716/11 |
| 5,926,822 A * | 7/1999 | Garman ..................... 715/201 |
| 6,359,584 B1 * | 3/2002 | Cordey et al. .............. 342/169 |
| 2004/0049729 A1 | 3/2004 | Penfield |
| 2004/0059518 A1 | 3/2004 | Rothschild |

FOREIGN PATENT DOCUMENTS

WO WO2004063939 A2 7/2004

OTHER PUBLICATIONS

Benninga et al., Financial Modeling, 2000, MIT Press, Second Edition, pp. 133-134.*
Seila, Andrew, F. "Spreadsheet Simulation", WSC '03: Proceedings of the 35th Conference on Winter Simulation: Driving Innovation, Dec. 2003, pp. 25-30.*
Medeiros, D.J. , et al, "Simulation Based Decision for a Shipyard Manufacturing Process", WSC '00: Proceedings of the 32nd Conference on Winter Simulation, Dec. 2000, pp. 1411-1414.*

* cited by examiner

*Primary Examiner*—Laurie Ries
(74) *Attorney, Agent, or Firm*—Schmeiser, Olsen & Watts; William H. Steinberg

(57) ABSTRACT

A method and system for computing statistical parameters for sets of data items, by executing instructions of a computer program that is coded within a spreadsheet. Each set is generated in a time sequence that is specific to each set. For each time sequence, each data item is one data value or a pair of data values. The data items appears one-at-a-time in only one cell structure of the spreadsheet at each time in the time sequence. The one cell structure is a single cell or two cells. A loop of iterations is performed for each set. In each iteration, a command is responded to by updating the statistical parameters based on the latest data item in the one cell structure in the spreadsheet. The updated statistical parameter are stored in a parameter field of the spreadsheet assigned to each statistical parameter.

30 Claims, 7 Drawing Sheets

SYSTEM AND METHOD FOR PERFORMING OVER TIME STATISTICS IN AN ELECTRONIC SPREADSHEET ENVIRONMENT

BACKGROUND OF THE INVENTION

1. Technical Field

The present invention relates generally to the field of information processing by digital computers, and more particularly to a method and system, in an electronic spreadsheet, for computing statistical data on a set of values taken over time either by a given cell or by a pair of cells.

2. Related Art

Before computers, numerical analyses, particularly financial analyses, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-left-hand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-OsbomeIMcGraw-Mll, 1990; and LeBlond, G. and Cobb, D., *Using* 1-2-3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require the recalculation of every relationship in the model with each change made. Electronic spreadsheet systems are well suited to solve "what-if" problems, that is, changing an input and seeing what happens to an output.

Electronic spreadsheets have become a tool of choice for computing statistics from a set of data. For a set of data arranged in a column, conventional electronic spreadsheet tools include means, in the form of statistical functions, to compute the average of the data set, or the maximum value of the data set, or the minimum value of the data set, or the standard deviation of the data set. For a couple of data ranges arranged for instance as a pair of columns, conventional electronic spreadsheet tools include means, in the form of statistical functions, to compute the covariance of the two data sets, or the correlation of the two data sets. When electronic spreadsheets are used to perform simulations of a model (business model, or industrial model, or nature life model), these statistical functions are very useful for deriving statistical information relative to the different simulation instances of the modelled process. Typically such simulations are performed by feeding a model with inputs which can either be randomly generated, or imported from external sources. Unfortunately these statistical functions operate on the base of a set of data, recorded within data ranges, so that each simulation must be first properly recorded onto a simulation result array, to eventually build a complete array of results upon which the statistical functions can operate. When the number of simulations increases (this is required to increase the confidence in the statistical results), the volume of information that may result may be prohibitive (and even reach the built-in limitations of the commercially available electronic spreadsheet tools). As the desired information relies to the statistical data, and not to each individual simulation output, the conventional statistical means available in electronic spreadsheet environment, are not suited for computing simulation statistics.

SUMMARY OF THE INVENTION

The present invention provides a method for computing at least one statistical parameter for at least one set of data items, said method comprising performing a loop having a plurality of iterations for each set of data items, said method being performed by execution of instructions by a processor of a computer system, said instructions comprised by a computer program that is coded within a spreadsheet, said spreadsheet being stored in a memory of the computer system, each set of data items having been generated in a time sequence such that each data item corresponds to a unique time in the time sequence, said time sequence being specific to each set of data items, for each time sequence each data item consisting of one data value or a pair of data values, the data items for each time in the time sequence appearing one-at-a-time in only one cell structure C of the spreadsheet in accordance with the time sequence, the one cell structure C consisting of a single cell or both a first cell and a second cell corresponding respectively to the one data value or the pair of data values, each iteration of each loop comprising:

receiving a command to update the at least one statistical parameter for a set S of the at least one set, said command identifying the cell structure C pertaining to the set S, said cell structure C comprising a latest data item of the set S, said spreadsheet not comprising any other data item of the set S, said latest data item corresponding to a latest time in the time sequence of the set S;

responsive to said command, updating the at least one statistical parameter for the set S based on the latest data item in the cell structure C to generate an updated at least one statistical parameter value for the set S; and storing each updated statistical parameter value for the set S in a parameter field of the spreadsheet assigned to each statistical parameter.

The present invention provides a computer system comprising a processor and a memory, a spreadsheet being stored in the memory, said spreadsheet having a computer program coded therein, said computer program comprising instructions that when executed by the processor perform a method for computing at least one statistical parameter for at least one set of data items, each set of data items having been generated in a time sequence such that each data item corresponds to a unique time in the time sequence, said time sequence being specific to each set of data items, for each time sequence each data item consisting of one data value or a pair of data values, the data items for each time in the time sequence appearing one-at-a-time in only one cell structure C of the spreadsheet in accordance with the time sequence, the one cell structure C consisting of a single cell or both a first cell and a second cell corresponding respectively to the one data value or the pair of data values, said method comprising performing a loop having a plurality of iterations for each set of data items, each iteration of each loop comprising:

receiving a command to update the at least one statistical parameter for a set S of the at least one set, said command identifying the cell structure C pertaining to the set S, said cell structure C comprising a latest data item of the set S, said spreadsheet not comprising any other data item of the set S, said latest data item corresponding to a latest time in the time sequence of the set S;

responsive to said command, updating the at least one statistical parameter for the set S based on the latest data item in the cell structure C to generate an updated at least one statistical parameter value for the set S; and storing each updated statistical parameter value for the set S in a parameter field of the spreadsheet assigned to each statistical parameter.

The present invention provides a computer program comprising instructions that when executed by a processor of a computer system perform a method for computing at least one statistical parameter for at least one set of data items, said computer program being coded within a spreadsheet, said spreadsheet being stored in a memory of the computer system, each set of data items having been generated in a time sequence such that each data item corresponds to a unique time in the time sequence, said time sequence being specific to each set of data items, for each time sequence each data item consisting of one data value or a pair of data values, the data items for each time in the time sequence appearing one-at-a-time in only one cell structure C of the spreadsheet in accordance with the time sequence, the one cell structure C consisting of a single cell or both a first cell and a second cell corresponding respectively to the one data value or the pair of data values, said method comprising performing a loop having a plurality of iterations for each set of data items, each iteration of each loop comprising:

receiving a command to update the at least one statistical parameter for a set S of the at least one set, said command identifying the cell structure C pertaining to the set S, said cell structure C comprising a latest data item of the set S, said spreadsheet not comprising any other data item of the set S, said latest data item corresponding to a latest time in the time sequence of the set S;

responsive to said command, updating the at least one statistical parameter for the set S based on the latest data item in the cell structure C to generate an updated at least one statistical parameter value for the set S; and storing each updated statistical parameter value for the set S in a parameter field of the spreadsheet assigned to each statistical parameter.

From a memory consumption and computing power consumption standpoint, the present invention is much more efficient than conventional means available in electronic spreadsheet environments.

BRIEF DESCRIPTION OF THE DRAWINGS

The present invention will best be understood by reference to the following detailed description of an illustrative detailed embodiment when read in conjunction with the accompanying drawings.

DETAILED DESCRIPTION OF THE INVENTION

The present invention is directed to a method, system, and computer program for managing and/or computing statistical information based on a set of values taken by a given cell or by a given pair of cells of a spreadsheet. The present invention comprises means for controlling, for a given cell or a given pair of cells, the set of values upon which the statistical computing is performed.

When invoked in a first mode called "Reset mode", the method re-initializes the computing of statistical information, to get rid of any past history.

When invoked in a second mode, called "Run mode", the method computes the statistical information based on the current value of the given cell or of the given pair of cells, and of the past historical values taken during the current "Run mode".

The method according to the present invention, for use in a multi-dimensional spreadsheet comprising a plurality of cells identified by a cell address along each dimension, comprises the steps of:

receiving a command for computing statistical data based on successive values of a first cell over a time period, said command comprising: (1) means for identifying said first cell, (2) means for determining the beginning and the end of the time period, and (3) a reference to a statistical function for computing statistical data based on the successive values of said first cell over said time period; and computing statistical data based on the successive values of said first cell over said time period, said computing statistical data comprising the further steps of, each time the value of said first cell is updated: (1) computing said statistical data by means of said statistical function, based on: the current value of said first cell, and the previously computed statistical data based on the successive values taken by the first cell from the beginning of the time period; and (2) storing the computed statistical data in place of the previously computed statistical data.

The present invention discloses an Over Time Statistic Manager (OTSM) handling the management and computation of statistical information, based on the values taken either by a single cell, or by a pair of cells.

The present invention solves the problem of the related art by recursively evaluating the desired statistical information, only on the base of the last simulation, thus avoiding to keep a high volume array of all simulations results.

Hardware

Figure 1A:
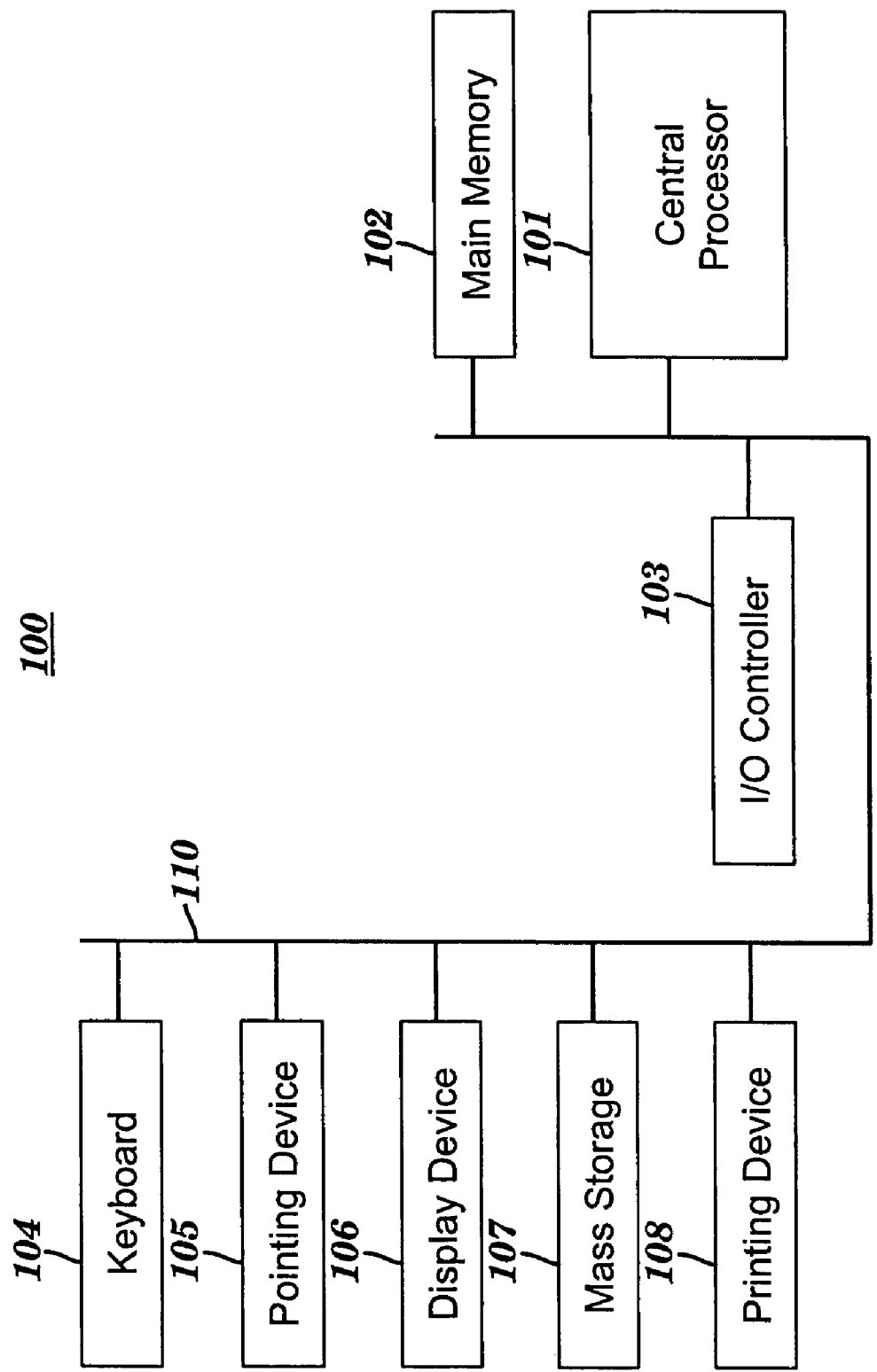
FIG. 1A is a block diagram of a computer system in which the present invention can be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In an embodiment, the computer system 100 includes an IBM-compatible personal computer, which is available from several vendors (including IBM of Armonk, N.Y.).

Figure 1B:
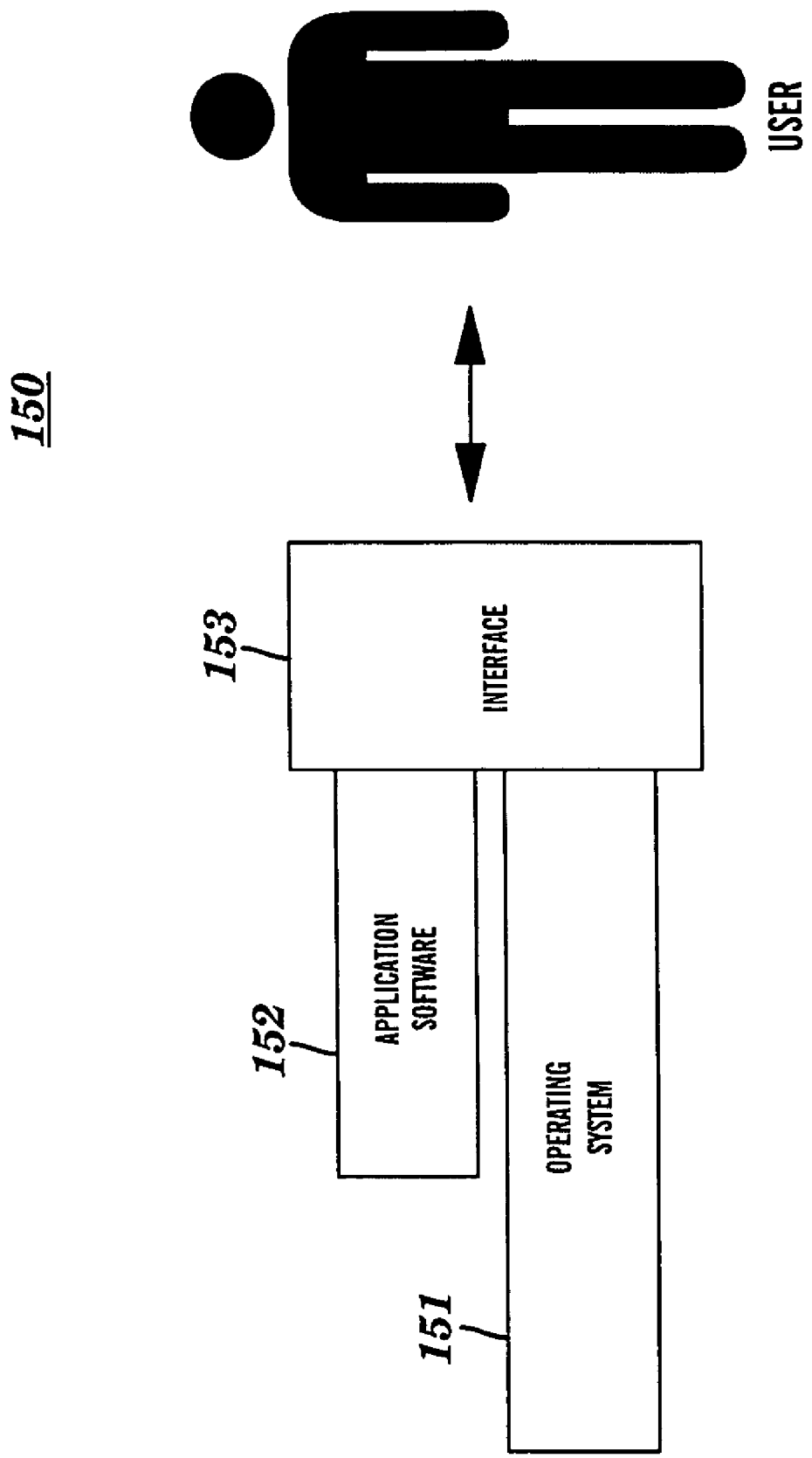
FIG. 1B is a block diagram of a software system including an operating system, an application software, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In an embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

The following description will focus on the embodiments of the present invention, which are embodied in spreadsheet applications operative in the Microsoft Windows environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
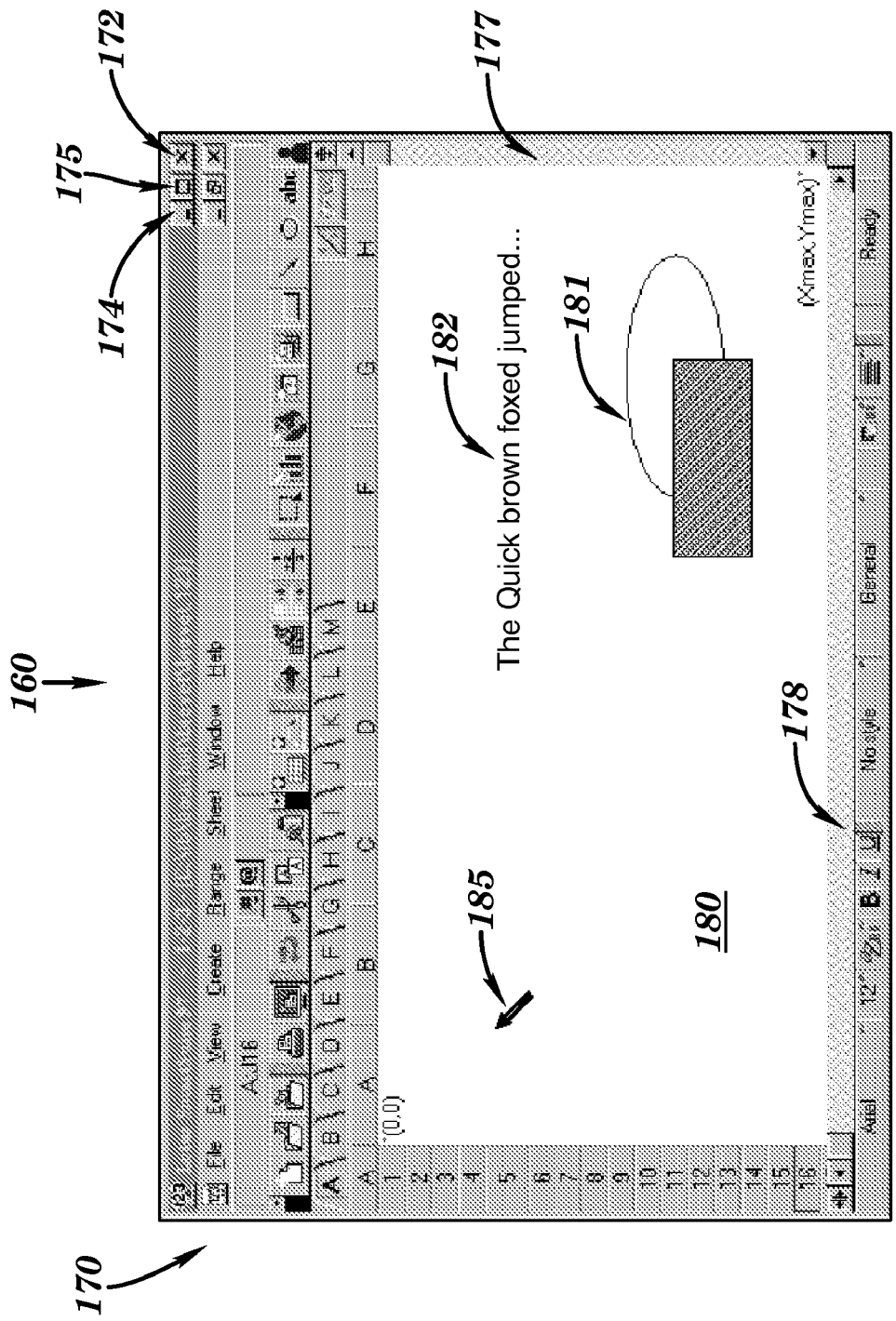
FIG. 1C illustrates the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or view port for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, resized, or scrolled by "clicking" (selecting) screen components 172, 174/5, and 177/8, respectively.

In an embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. The screen cursor control device 105 may be a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art. See, e.g., Petzold, C., *Programming Windows*, Second Edition, Microsoft Press, 1990. The disclosures of each are hereby incorporated by reference.

Figure 2A:
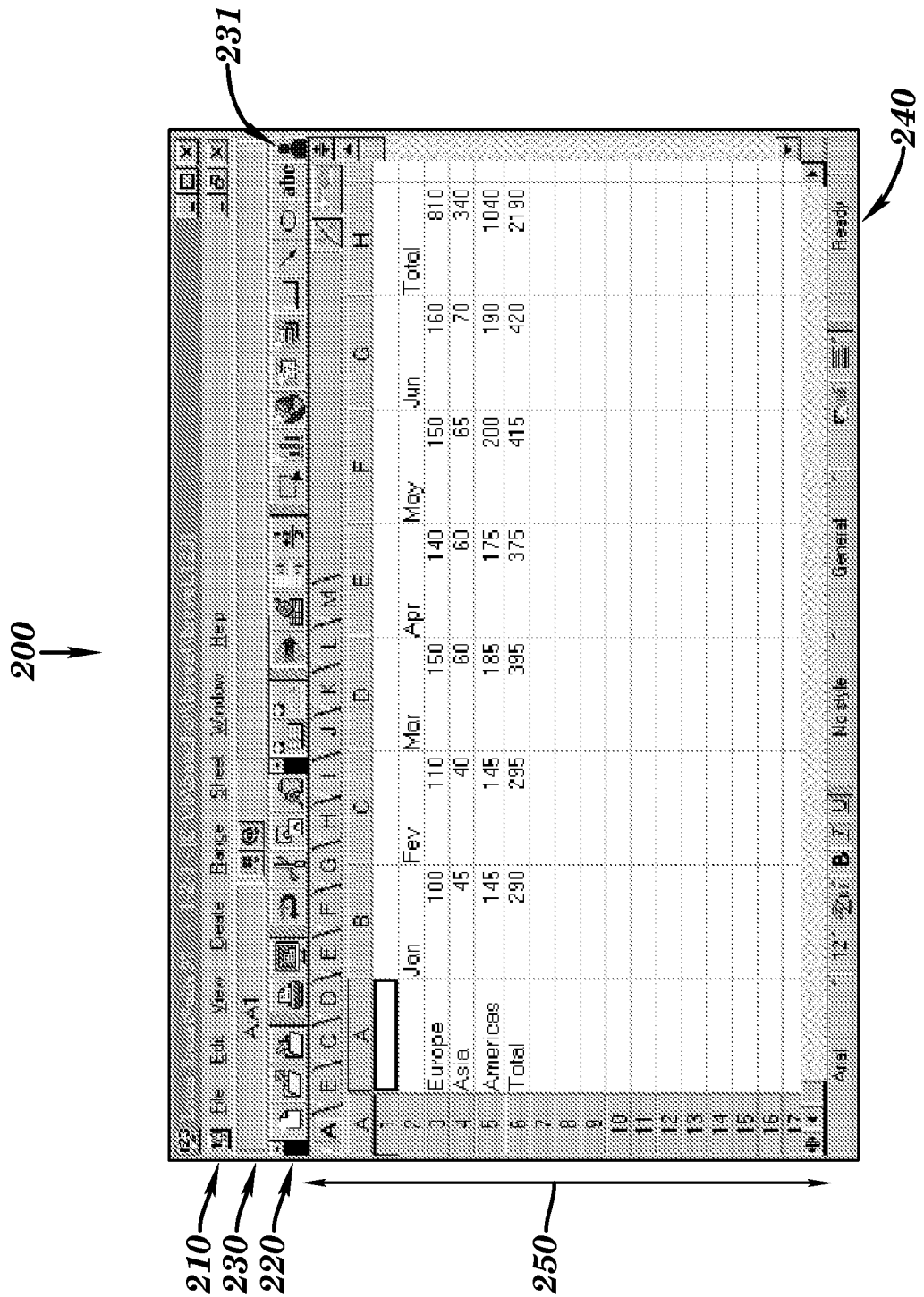
FIG. 2A shows a spreadsheet notebook interface used in the accordance with the present invention.

Shown in FIG. 2A, a spreadsheet notebook interface of the present invention will now be described. The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position. At the status line 240, system 100 displays information about the current state of the workbook. For example, a "READY" indicator means that the system is ready for the user to select another task to be performed.

Figure 2B:
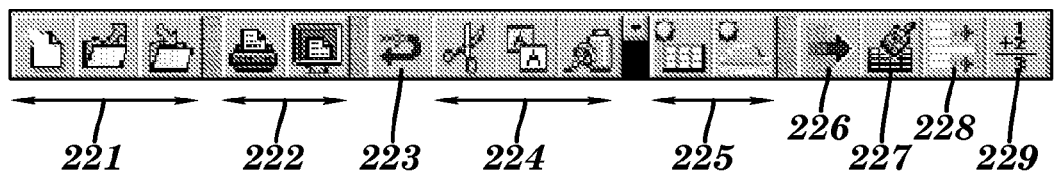
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties, In an exemplary embodiment, toolbar 220 includes file manipulation buttons 221, printing buttons 222, an undo button 223, cut, copy, and paste buttons 224, information pop-up window buttons tool 225, a range selection button 226, a style copy button 227, a column resizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, resizing, and deleting. In an embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active cell (i.e., the cell that is currently selected).

Figure 2C:
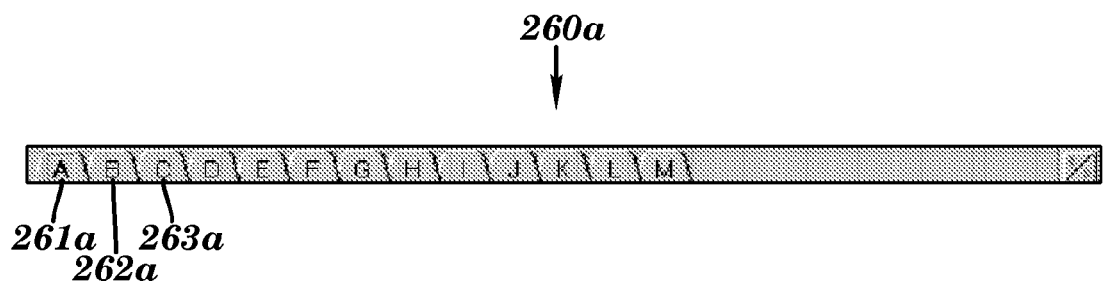
FIGS. 2C and 2D show page identifiers for rapidly accessing and manipulating individual pages of the notebook interface shown in FIG. 2A.
Figure 2D:
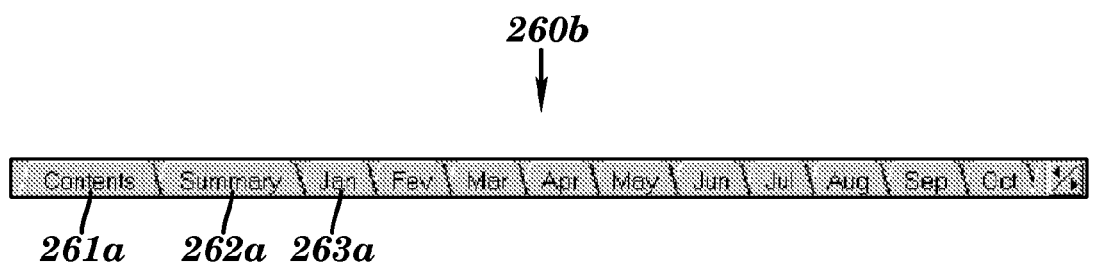

As shown in FIGS. 2C and 2D, individual notebook pages are identified by page identifiers 260a and 260b, respectively, which may be located along one edge of a notebook. In an embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve to aid in the entry of spreadsheet formulas. For example, when entering a formula referring to cells on another page, the user may simply use the descriptive page name in the formula itself (as described herein below), thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Management Over Time Statistics

In contrast with just-described conventional tools, the present invention provides a more powerful, less resource-demanding approach for managing and computing statistical data based on the set or sequence of values taken by a given cell or a pair of cells. The method according to the present invention comprises the following five steps:

The first step is building a model of the desired process, based on formulas and functions used in selected cells or ranges of cells. Such a model may be fed by input cells which can correspond to random number generators (also available as standard built-in functions).

The second step is identifying the one or plurality of cells of interest, referred to as "Output Cells" (OC), which deserve a statistical analysis. For instance it may be desired to compute, for the sequence of simulations, the standard deviation of a cell OC1, the standard deviation of a cell OC2, and the covariance between the cells OC1 and OC2.

The third step is initializing selected cells with a new set of functions, Over Time Statistical Functions (OTSF), computing the desired statistical information. Such functions are easy to master as being direct derivatives of the conventional statistical functions. If the invocation of a conventional statistical function is "@FCT(argument_list)", then the invocation of the corresponding OTS function is "@OTFCT(Reset, argument_list)", where the additional argument "Reset" points to a Boolean cell playing the role of a function reset. In the example herein: (1) a first cell will be filled with the formula "@OTSTD(Reset, OC1)"; (2) a second cell will be filled with the formula "@OTSTD(Reset, OC2)"; and (3) a third cell will be filled with the formula "@OTCOV(Reset, OC1, OC2)". The value of the cell "Reset" is set to FALSE, in order to prevent the re-initialization of the history (see next step).

The fourth step is entering a loop for running a sequence of simulations according to the modeled processes. Each simulation corresponds to an iteration of the loop. Such a loop can easily be implemented by simple macros. Each iteration of the loop includes: (1) feeding the model with a new set of input cells (e.g., by forcing a spreadsheet recalculation if input cells contains random number generators); and (2) checking for the end of the loop and resume the loop if its end is not reached. It is noted that this loop is much simpler to write than the one of the conventional scenario, which requires managing an array of simulation results.

In the fifth step, should the user want to run another set of simulations, then the user should first set the value of the cell named "Reset" equal to TRUE, and then set the value of the cell named "Reset" equal to FALSE.

With this scenario, no simulation table is created and managed. Therefore much less computing resources are required, and the associated capacity constraints are removed. Furthermore the loop of the fourth step above is quite simple, typically of the form: For I=1 to N; Application.recalc; EndFor.

The Over Time Statistic Manager (OTSM) is the entity managing the Over Time Statistical Functions. In an embodiment of the present invention assuming a Lotus 123 environment, the following OTSF are considered:

@OTMAX(reset, cell1): for computing the maximum value taken over time by cell1,

@OTMIN(reset, cell1): for computing the minimum value taken over time by cell1,

@OTAVG(reset, cell1): for computing the average value taken over time by cell1,

@OTSTD(reset, cell1): for computing the standard deviation of the values taken over time by cell1, @OTCOV(reset, cell1, cell2): for computing the covariance between the values taken over time by cell1 and cell2, @OTCORREL(reset, cell1, cell2): for computing the correlation between the values taken over time by cell1 and cell2, where:

"reset" is the name or the address of an individual cell used to reset the computation of statistical information, "cell1" and "cell2" are the names or addresses of two individual cells whose set or sequence of values is the base for computing statistical information.

Other similar OTSF could be defined without departing from the spirit of the present invention.

The OTSM takes control each time an OTSF is invoked. The OTSM handles two types of internal tables:

a Single Over Time Working Zone (SOTWZ) and
a Double Over Time Working Zone (DOTWZ), as described in the following section.

Figure 3:
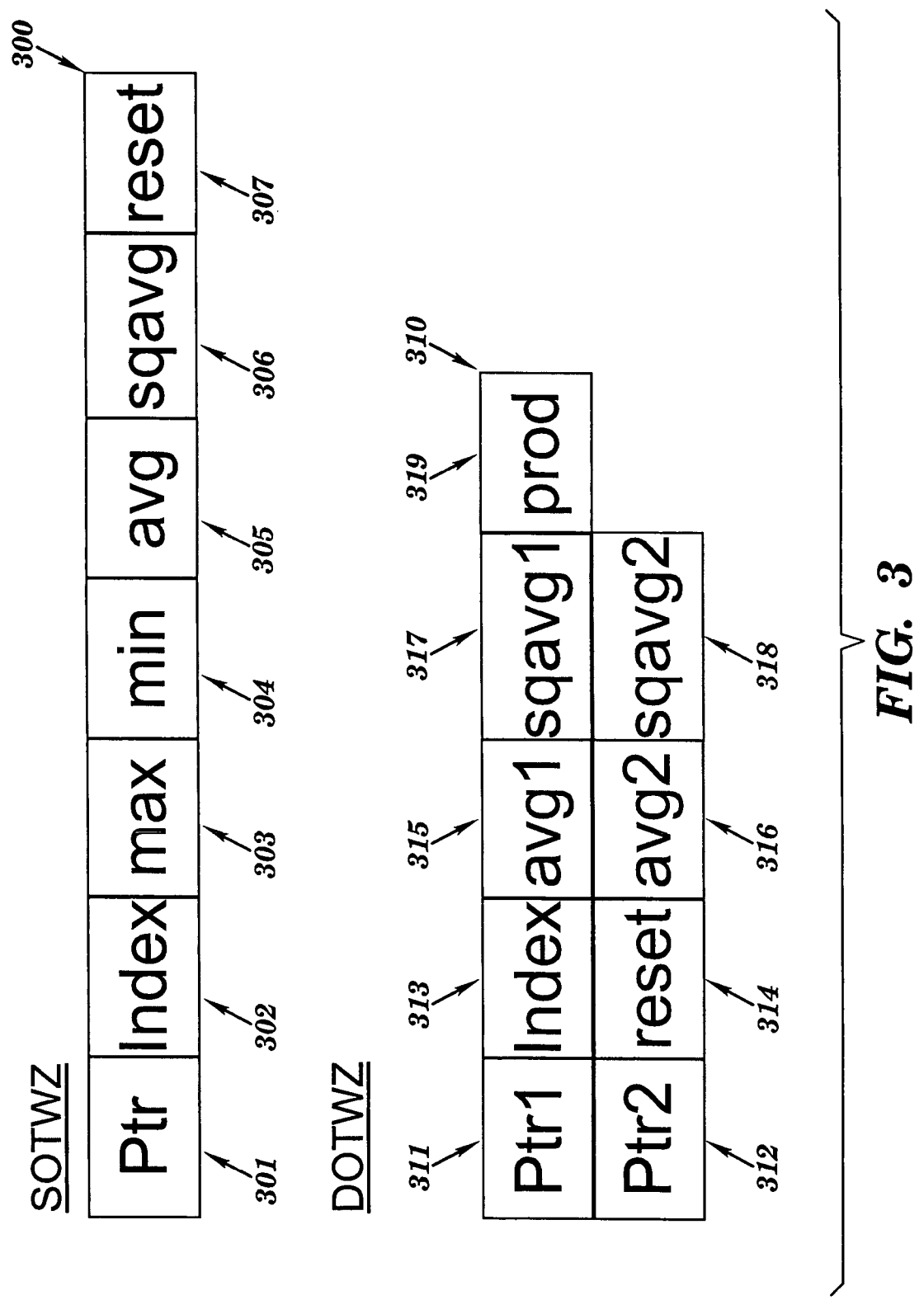
FIG. 3 illustrates the structure of the "Single Over Time Working Zone" and of the "Double Over Time Working Zone" used in embodiments of the present invention.

For each pair (reset, cell1) passed as argument of an OTSF is created a SOTWZ 300 the structure of which is described in FIG. 3. Thus for a SOTWZ, the set or sequence S of data items being statistically processed consists of one data value (identified by cell1) for each time in the time sequence of data items in the set S. A SOTWZ 300 comprises the following fields:

a "Ptr" field 301 pointing to the address of the cell "cell1" associated to the SOTWZ 300 an "Index" field 302 counting the number of samples used to compute the output of the OTSF, "max" field 303 recording the highest value of the cell "cell1" associated to the SOTWZ 300, a "min" field 304 recording the lowest value of the cell "cell1" associated to the SOTWZ 300, an "avg" field 305 recording the average value of the cell "cell1" associated to the SOTWZ 300, a "sqavg" field 306 recording the average of the square value of the cell "cell1" associated to the SOTWZ 300, A "reset" field 307 pointing to the cell "reset" associated to the SOTWZ 300.

For each triple (reset, cell1, cell2) passed as argument of an OTSF is created a DOTWZ 310 the structure of which is described in FIG. 3. Thus for a DOTWZ, the set or sequence S of data items being statistically processed consists of a pair of data values (identified by cell1 and cell2) for each time in the time sequence of data items in the set S. A DOTWZ 310 comprises the following fields:

a "Ptr1" field 311 pointing to the address of the cell "cell1" associated to the DOTWZ 310, a "Ptr2" field 312 pointing to the address of the cell "cell2" associated to the DOTWZ 310, an "Index" field 313 counting the number of samples used to compute the output of the OTSF, a "reset" field 314 pointing to the cell "reset" associated to the DOTWZ 310, an "avg1" field 315 recording the average value of the cell "cell1" associated to the DOTWZ 310, an "avg2" field 316 recording the average value of the cell "cell2" associated to the DOTWZ 310, a "sqavg1" field 317 recording the average of the square value of the cell "cell1" associated to the DOTWZ 310, a "sqavg2" field 318 recording the average of the square value of the cell "cell2" associated to the DOTWZ 310, a "prod" field 319 recording the average of the product of the values of the cells "cell1" and "cell2" associated to the DOTWZ 310.

Figure 4:
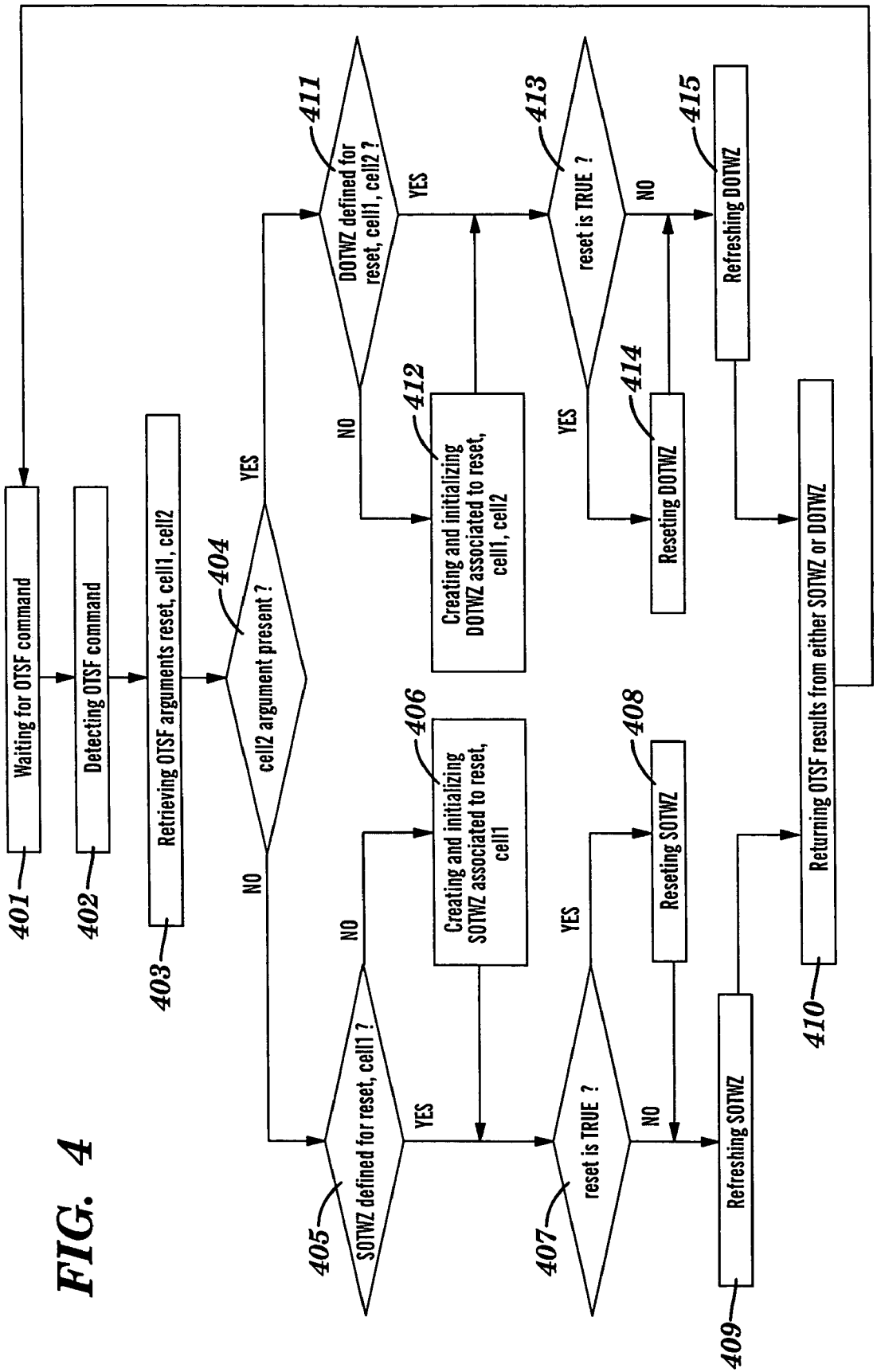
FIG. 4 is a flow chart illustrating the method for managing over time statistics to take according to the present invention.

The method for managing OTDF according to the present invention is summarized in the flowchart of FIG. 4. This OTSM method can be seen as the processing of an OTSF.

The method for managing OTDF according to the present invention is summarized in flowchart 400 of FIG. 4. This OTSM method can be seen as the processing of an OTSF.

FIG. 4 depicts a loop, wherein each iteration of the loop comprises steps 401-410. The loop splits at step 404 into a first path of steps 405-409 (implementing a SOTWZ) and a second path of steps 411-415 (implementing a DOTWZ). The first and second paths converge at step 410 which is the last step of the loop.

At step 401, the method is in its default state, waiting for an event to initiate the process.

At step 402, an event is detected, as a result of an invocation of an OTSF.

At step 403, the arguments of the OTSF are retrieved (first argument under the name "reset", the second argument under the name "cell1", the third argument, if present, under the name "cell2"). The address or cell name contained in "cell1" (and "cell2" if present) identifies the particular sequence (S) of data items being statistically processed in the current iteration of the loop.

A cell structure C stores a data item of the latest data value(s) in the set or sequence S. The cell structure C for storing the latest data value(s) is "cell1" for a SOTWZ. The cell structure C for storing the latest data value(s) is both "cell1" and "cell2" for a DOTWZ. Since the variables "cell1" (and "cell2" if present) are received in each iteration of the loop, different iterations of the loop may pertain to the same or different sequences of data being statistically processed depending on whether the values of "cell1" (and "cell2" if present) are the same or different in the different iterations.

For example, consider a first set or sequence (S1) of data items and a second set or sequence (S2) of data items being statistically processed by looping in accordance with FIG. 4. After performing a first iteration of the loop for the set S1 and after performing a first iteration of the loop for the set S2 a last iteration of the loop for the set S1 may be performed to end the loop of the set S1, and a last iteration of the loop for the set S2 may be performed to end the loop of the set S2. Note that in one embodiment each data item in the set S1 may consist of one data value (identified by "cell1") corresponding to an iteration of a SOTWZ implemented in steps 405-409, and each data item in the set S2 may consist of a pair of data values (identified by "cell1" and "cell2") corresponding to an iteration of a DOTWZ implemented in steps 411-415.

At step 404, a test is performed to check if a third argument cell2 was present. If it is the case, then control is given to step 411 for implementing a DOTWZ; otherwise control is given to step 405 for implementing a SOTWZ.

At step 405 a test is performed to check if an SOTWZ 300 associated to the cell pair (reset, cell1) is already defined. If it is the case, then control is given to step 407; otherwise control is given to step 406.

At step 406, a new SOTWZ 300 is created and initialized with the following fields:

the "Ptr" field 301 is initialized with a pointer to the cell cell1, the "Index" field 302 is initialized with a zero value, the "max" field 303 is initialized with the value of the cell cell1, the "min" field 304 is initialized with the value of the cell cell1, the "avg" field 305 is initialized with the value of the cell cell1, the "sqavg" field 306 is initialized with the square of the value of the cell cell1, the "reset" field 307 is initialized with a pointer to the cell "reset".

At step 407, a test is performed to check if reset is equal to TRUE. If it is the case, then control is given to step 408; otherwise control is given to step 409.

At step 408, the SOTWZ 300 is reset with the following actions on the fields:

the "Index" field 302 is initialized with a zero value, the "max" field 303 is initialized with the value of the cell cell1, the "min" field 304 is initialized with the value of the cell cell1, the "avg" field 305 is initialized with the value of the cell cell1, the "sqavg" field 306 is initialized with the square of the value of the cell cell1.

At step 409, the SOTWZ 300 is refreshed with the following actions on the fields:

the "max" field 303 is set equal to max(max, cell1), the "min" field 304 is set equal to min(min, cell1), the "avg" field 305 is set equal to (index*avg+cell1)/(index+1), the "sqavg" field 306 is set equal to (index*sqavg+cell1*cell1)/(index+1), the "Index" field 302 is set equal to index+1.

At step 410, the method returns the result of the OTSF function, depending on this function, as listed below:
@OTMAX(reset,cell1)=max;
@OTMIN(reset,cell1)=min;
@OTAVG(reset, cell1)=avg
@OTSTD(reset, cell1)=sqrt(sqavg−avg*avg)
@OTCOV(reset, cell1, cell2)=prod−avg1*avg2
@OTCORREL(reset, cell1, cell2)=(prod−avg1*avg2)/sqrt(sqavg1−avg1*avg1)/sqrt(sqavg2−avg2*avg2)

Then control is returned back to the initial step 401 for handling another OTSF command for initiating execution of another iteration of a loop for a set or sequence of data items.

At step 411, a test is performed to check if an DOTWZ 310 associated with the cell triple (reset, cell1, cell2) is already defined. If it is the case, then control is given to step 413; otherwise control is given to step 412.

At step 412, a new DOTWZ 310 is created and initialized with the following fields:

the "Ptr1" field 311 is initialized with a pointer to the cell cell1, the "Ptr2" field 312 is initialized with a pointer to the cell cell2, the "Index" field 313 is initialized with a zero value, the "reset" field 314 is initialized with a pointer to the cell reset, the "avg1" field 315 is initialized with the value of the cell cell1, the "avg2" field 316 is initialized with the value of the cell cell2, the "sqavg1" field 317 is initialized with the square of the value of the cell cell1, the "sqavg2" field 318 is initialized with the square of the value of the cell cell2, and the "prod" field 319 is initialized with the product of the values of the cells cell1 and cell2.

At step 413, a test is performed to check if reset is equal to TRUE. If it is the case, then control is given to step 414, otherwise control is given to step 415.

At step 414, the DOTWZ 310 is reset with the following actions on the fields:

the "Index" field 313 is initialized with a zero value, the "avg1" field 315 is initialized with the value of the cell cell1, the "avg2" field 316 is initialized with the value of the cell cell2, the "sqavg1" field 317 is initialized with the square of the value of the cell cell1, the "sqavg2" field 318 is initialized with the square of the value of the cell cell2, and the "prod" field 319 is initialized with the product of the values of the cells cell1 and cell2.

At step 415, the DOTWZ 310 is refreshed with the following actions on the fields:

the "avg1" field 315 is set equal to (index*avg1+cell1)/(index+1), the "avg2" field 316 is set equal to (index*avg2+cell1)/(index+1), the "sqavg1" field 317 is set equal to (index*sqavg1+cell1*cell1)/(index+1), the "sqavg2" field 318 is set equal to (index*sqavg2+cell2*cell2)/(index+1), the "prod" field 319 is set equal to (index*prod+cell1*cell2)/(index+1), and finally the "Index" field 313 is set equal to index+1.

Then control is given to step 410.

What has been described is merely illustrative of the application of the principles of the present invention. Other arrangements and methods can be implemented by those skilled in the art without departing from the spirit and scope of the present invention.

What is claimed is:

1. A method for computing at least one statistical parameter for at least one set of data items, said method comprising performing a loop having a plurality of iterations for each set of data items, said method being performed by execution of instructions by a processor of a computer system, said instructions comprised by a computer program that is coded within a spreadsheet, said spreadsheet being stored in a memory of the computer system, each set of data items having been generated in a time sequence such that each data item corresponds to a unique time in the time sequence, said time sequence being specific to each set of data items, for each time sequence each data item consisting of one data value or a pair of data values, the data items for each time in the time sequence appearing one-at-a-time in only one cell structure C of the spreadsheet in accordance with the time sequence, the one cell structure C consisting of a single cell or both a first cell and a second cell, said single cell storing only the one data value, said first cell storing only a first data value of the pair of data values and said second cell storing only a second data value of the pair of data values, each iteration of each loop comprising:

said processor receiving a command to update the at least one statistical parameter for a set S of the at least one set, said command identifying the cell structure C pertaining to the set S, said cell structure C comprising a latest data item of the set S, said spreadsheet not comprising any other data item of the set S, said latest data item corresponding to a latest time in the time sequence of the set S;

responsive to said command, said processor updating the at least one statistical parameter for the set S based on the latest data item in the cell structure C to generate an updated at least one statistical parameter value for the set S; and said processor storing each updated statistical parameter value for the set S in a parameter field of the spreadsheet assigned to each statistical parameter.

2. The method of claim 1, wherein if the latest data item is not a first data item in the time sequence, then the latest data item in the cell structure C has replaced an immediately preceding data item in the cell structure C and each updated statistical parameter value has replaced an immediately preceding statistical parameter value in the parameter field assigned to each statistical parameter, and wherein the immediately preceding data item and the immediately preceding statistical parameter value correspond to an immediately preceding time relative to the latest time in the time sequence; and wherein if the latest data item is the first data item in the time sequence, then said updating the at least one statistical parameter value for the set S comprises initializing said at least one statistical parameter value for the set S in the parameter field assigned to each statistical parameter.

3. The method of claim 1, wherein the at least one set of data items comprises a first set (S1) of data items and a second set (S2) of data items, and wherein performing the loop for the sets S1 and S2 comprises:

after performing a first iteration of the loop for the set S1 and after performing a first iteration of the loop for the set S2, performing a last iteration of the loop for the set S1 to end the loop of the set S1 and performing a last iteration of the loop for the set S2 to end the loop of the set S2.

4. The method of claim 3, wherein each data item in the set S1 consists of one data value, and wherein each data item in the set S2 consists of a pair of data values.

5. The method of claim 1, wherein after performing a last iteration for the set S to end the loop of the set S:

copying the updated at least one statistical parameter value from the parameter field of the spreadsheet to a corresponding at least one designated output cell in the spreadsheet.

6. The method of claim 1, wherein each data item in a first set of the at least one set of data items consists of one data value.

7. The method of claim 1, wherein each data item in a first set of the at least one set of data items consists of a pair of data values.

8. The method of claim 7, wherein a first statistical parameter of the at least one statistical parameter comprises an arithmetic average of the product of a first data value of the pair of data values and a second data value of the pair of data values.

9. The method of claim 1, wherein if the one cell structure C consists of the single cell then each iteration of each loop further comprises either creating and initializing a Single Over Time Working Zone (SOTWZ) data structure or resetting the SOTWZ data structure, wherein the SOTWZ data structure comprises:
a Ptr field pointing to the address of the single cell;
a SOTWZ Index field counting the number of samples used to update each statistical parameter value;
a Max field recording the highest value of the single cell;
a Min field recording the lowest value of the single cell;
an Avg field recording the average value of the single cell;
a Sqavg field recording the average of the square value of the single cell; and
a Reset field pointing to a reset cell used to reset a computation of statistical information, wherein if one cell structure C consists of the first cell and the second cell then each iteration of each loop further comprises either creating and initializing a Double Over Time Working Zone (DOTWZ) data structure or resetting the DOTWZ data structure, wherein the DOTWZ data structure comprises:
a Ptr1 field pointing to the address of the first cell;
a Ptr2 field pointing to the address of the second cell;
a DOTWZ Index field counting the number of samples used to update each statistical parameter value;
an Avg1 field recording the average value of the first cell;
an Avg2 field recording the average value of the second cell;
a Sqavg1 field recording the average of the square value of the first cell;
a Sqavg2 field recording the average of the square value of the second cell;
a Prod field recording the average of the product of the value of the first cell and the value of the second cell.

10. The method of claim 9, wherein the SOTWZ data structure consists of the Ptr field, the SOTWZ Index field, the Max field, the Min field, the Avg field, the Sqavg field, and the Reset field, and wherein the DOTWZ data structure consists of the Ptr1 field, the Ptr2 field, the DOTWZ Index field, the Avg1 field, the Avg2 field, the Sqavg1 field, the Sqavg2 field, and the Prod field.

11. A computer system comprising a processor and a memory, a spreadsheet being stored in the memory, said spreadsheet having a computer program coded therein, said computer program comprising instructions that when executed by the processor perform a method for computing at least one statistical parameter for at least one set of data items, each set of data items having been generated in a time sequence such that each data item corresponds to a unique time in the time sequence, said time sequence being specific to each set of data items, for each time sequence each data item consisting of one data value or a pair of data values, the data items for each time in the time sequence appearing one-at-a-time in only one cell structure C of the spreadsheet in accordance with the time sequence, the one cell structure C consisting of a single cell or both a first cell and a second cell, said single cell storing only the one data value, said first cell storing only a first data value of the pair of data values and said second cell storing only a second data value of the pair of data values, said method comprising performing a loop having a plurality of iterations for each set of data items, each iteration of each loop comprising:

receiving a command to update the at least one statistical parameter for a set S of the at least one set, said command identifying the cell structure C pertaining to the set S, said cell structure C comprising a latest data item of the set S, said spreadsheet not comprising any other data item of the set S, said latest data item corresponding to a latest time in the time sequence of the set S;

responsive to said command, updating the at least one statistical parameter for the set S based on the latest data item in the cell structure C to generate an updated at least one statistical parameter value for the set S; and storing each updated statistical parameter value for the set S in a parameter field of the spreadsheet assigned to each statistical parameter.

12. The computer system of claim 11,
wherein if the latest data item is not a first data item in the time sequence, then the latest data item in the cell structure C has replaced an immediately preceding data item in the cell structure C and each updated statistical parameter value has replaced an immediately preceding statistical parameter value in the parameter field assigned to each statistical parameter, and wherein the immediately preceding data item and the immediately preceding statistical parameter value correspond to an immediately preceding time relative to the latest time in the time sequence; and
wherein if the latest data item is the first data item in the time sequence, then said updating the at least one statistical parameter value for the set S comprises initializing said at least one statistical parameter value for the set S in the parameter field assigned to each statistical parameter.

13. The computer system of claim 11, wherein the at least one set of data items comprises a first set (S1) of data items and a second set (S2) of data items, and wherein performing the loop for the sets S1 and S2 comprises:
after performing a first iteration of the loop for the set S1 and after performing a first iteration of the loop for the set S2, performing a last iteration of the loop for the set S1 to end the loop of the set S1 and performing a last iteration of the loop for the set S2 to end the loop of the set S2.

14. The method of claim 13, wherein each data item in the set S1 consists of one data value, and wherein each data item in the set S2 consists of a pair of data values.

15. The computer system of claim 11, wherein after performing a last iteration for the set S to end the loop of the set S:
copying the updated at least one statistical parameter value from the parameter field of the spreadsheet to a corresponding at least one designated output cell in the spreadsheet.

16. The computer system of claim 11, wherein each data item in a first set of the at least one set of data items consists of one data value.

17. The computer system of claim 11, wherein each data item in a first set of the at least one set of data items consists of a pair of data values.

18. The computer system of claim 17, wherein a first statistical parameter of at the least one statistical parameter comprises an arithmetic average of the product of a first data value of the pair of data values and a second data value of the pair of data values.

19. The computer system of claim 11,
wherein if the one cell structure C consists of the single cell then each iteration of each loop further comprises either creating and initializing a Single Over Time Working Zone (SOTWZ) data structure or resetting the SOTWZ data structure,
wherein the SOTWZ data structure comprises:
a Ptr field pointing to the address of the single cell;
a SOTWZ Index field counting the number of samples used to update each statistical parameter value;
a Max field recording the highest value of the single cell;
a Min field recording the lowest value of the single cell;
an Avg field recording the average value of the single cell;
a Sqavg field recording the average of the square value of the single cell; and
a Reset field pointing to a reset cell used to reset a computation of statistical information,
wherein if one cell structure C consists of the first cell and the second cell then each iteration of each loop further comprises either creating and initializing a Double Over Time Working Zone (DOTWZ) data structure or resetting the DOTWZ data structure,
wherein the DOTWZ data structure comprises:
a Ptr1 field pointing to the address of the first cell;
a Ptr2 field pointing to the address of the second cell;
a DOTWZ Index field counting the number of samples used to update each statistical parameter value;
an Avg1 field recording the average value of the first cell;
an Avg2 field recording the average value of the second cell;
a Sqavg1 field recording the average of the square value of the first cell;
a Sqavg2 field recording the average of the square value of the second cell;
a Prod field recording the average of the product of the value of the first cell and the value of the second cell.

20. The computer system of claim 19,
wherein the SOTWZ data structure consists of the Ptr field, the SOTWZ Index field, the Max field, the Min field, the Avg field, the Sqavg field, and the Reset field, and
wherein the DOTWZ data structure consists of the Ptr1 field, the Ptr2 field, the DOTWZ Index field, the Avg1 field, the Avg2 field, the Sqavg1 field, the Sqavg2 field, and the Prod field.

21. A program storage device comprising a computer program stored therein, said program storage device being computer readable, said computer program comprising instructions that when executed by a processor of a computer system perform a method for computing at least one statistical parameter for at least one set of data items, said computer program being coded within a spreadsheet, said spreadsheet being stored in a memory of the computer system, each set of data items having been generated in a time sequence such that each data item corresponds to a unique time in the time sequence, said time sequence being specific to each set of data items, for each time sequence each data item consisting of one data value or a pair of data values, the data items for each time in the time sequence appearing one-at-a-time in only one cell structure C of the spreadsheet in accordance with the time sequence, the one cell structure C consisting of a single cell or both a first cell and a second cell, said single cell storing only the one data value, said first cell storing only a first data value of the pair of data values and said second cell storing only a second data value of the pair of data values, said method comprising performing a loop having a plurality of iterations for each set of data items, each iteration of each loop comprising:
receiving a command to update the at least one statistical parameter for a set S of the at least one set, said command identifying the cell structure C pertaining to the set S, said cell structure C comprising a latest data item of the set S, said spreadsheet not comprising any other data item of the set S, said latest data item corresponding to a latest time in the time sequence of the set S;
responsive to said command, updating the at least one statistical parameter for the set S based on the latest data item in the cell structure C to generate an updated at least one statistical parameter value for the set S; and storing each updated statistical parameter value for the set S in a parameter field of the spreadsheet assigned to each statistical parameter.

22. The program storage device of claim 21,
wherein if the latest data item is not a first data item in the time sequence, then the latest data item in the cell structure C has replaced an immediately preceding data item in the cell structure C and each updated statistical parameter value has replaced an immediately preceding statistical parameter value in the parameter field assigned to each statistical parameter, and
wherein the immediately preceding data item and the immediately preceding statistical parameter value correspond to an immediately preceding time relative to the latest time in the time sequence; and
wherein if the latest data item is the first data item in the time sequence, then said updating the at least one statistical parameter value for the set S comprises initializing said at least one statistical parameter value for the set S in the parameter field assigned to each statistical parameter.

23. The program storage device of claim 21, wherein the at least one set of data items comprises a first set (S1) of data items and a second set (S2) of data items, and wherein performing the loop for the sets S1 and S2 comprises:
after performing a first iteration of the loop for the set S1 and after performing a first iteration of the loop for the set S2, performing a last iteration of the loop for the set S1 to end the loop of the set S1 and performing a last iteration of the loop for the set S2 to end the loop of the set S2.

24. The program storage device of claim 23, wherein each data item in the set S1 consists of one data value, and wherein each data item in the set S2 consists of a pair of data values.

25. The program storage device of claim 21, wherein after performing a last iteration for the set S to end the loop of the set S:
copying the updated at least one statistical parameter value from the parameter field of the spreadsheet to a corresponding at least one designated output cell in the spreadsheet.

26. The program storage device of claim 21, wherein each data item in a first set of the at least one set of data items consists of one data value.

27. The program storage device of claim 21, wherein each data item in a first set of the at least one set of data items consists of a pair of data values.

28. The program storage device of claim 27, wherein a first statistical parameter at the least one statistical parameter comprises an arithmetic average of the product of a first data value of the pair of data values and a second data value of the pair of data values.

29. The program storage device of claim 21,
wherein if the one cell structure C consists of the single cell then each iteration of each loop further comprises either creating and initializing a Single Over Time Working Zone (SOTWZ) data structure or resetting the SOTWZ data structure,
wherein the SOTWZ data structure comprises:
a Ptr field pointing to the address of the single cell;
a SOTWZ Index field counting the number of samples used to update each statistical parameter value;
a Max field recording the highest value of the single cell;
a Min field recording the lowest value of the single cell;
an Avg field recording the average value of the single cell;
a Sqavg field recording the average of the square value of the single cell; and
a Reset field pointing to a reset cell used to reset a computation of statistical information,
wherein if one cell structure C consists of the first cell and the second cell then each iteration of each loop further comprises either creating and initializing a Double Over Time Working Zone (DOTWZ) data structure or resetting the DOTWZ data structure,
wherein the DOTWZ data structure comprises:
a Ptr1 field pointing to the address of the first cell;
a Ptr2 field pointing to the address of the second cell;
a DOTWZ Index field counting the number of samples used to update each statistical parameter value;
an Avg1 field recording the average value of the first cell;
an Avg2 field recording the average value of the second cell;
a Sqavg1 field recording the average of the square value of the first cell;
a Sqavg2 field recording the average of the square value of the second cell;
a Prod field recording the average of the product of the value of the first cell and the value of the second cell.

30. The computer program storage device of claim 29,
wherein the SOTWZ data structure consists of the Ptr field, the SOTWZ Index field, the Max field, the Min field, the Avg field, the Sqavg field, and the Reset field, and
wherein the DOTWZ data structure consists of the Ptr1 field, the Ptr2 field, the DOTWZ Index field, the Avg1 field, the Avg2 field, the Sqavg1 field, the Sqavg2 field, and the Prod field.

* * * * *